US012768197B2

(12) United States Patent
Banse et al.

(10) Patent No.: US 12,768,197 B2
(45) Date of Patent: Oct. 20, 2026

(54) LOCK

(71) Applicant: ABUS August Bremicker Söhne KG, Wetter-Volmarstein (DE)

(72) Inventors: Manuel Banse, Herborn (DE); Stefan Heinemann, Wetter (DE)

(73) Assignee: ABUS August Bremicker Söhne KG, Wetter-Volmarstein (DE)

(*) Notice: Subject to any disclaimer, the term of this patent is extended or adjusted under 35 U.S.C. 154(b) by 107 days.

(21) Appl. No.: 17/911,259

(22) PCT Filed: Mar. 15, 2021

(86) PCT No.: PCT/EP2021/056563
§ 371 (c)(1),
(2) Date: Sep. 13, 2022

(87) PCT Pub. No.: WO2021/185779
PCT Pub. Date: Sep. 23, 2021

(65) Prior Publication Data
US 2023/0101669 A1 Mar. 30, 2023

(30) Foreign Application Priority Data
Mar. 17, 2020 (DE) ..................... 10 2020 107 214.7
Mar. 9, 2021 (DE) ..................... 10 2021 105 647.0

(51) Int. Cl.
*E05B 17/20* (2006.01)
*E05B 47/06* (2006.01)
(Continued)

(52) U.S. Cl.
CPC ...... *E05B 17/2038* (2013.01); *E05B 17/2007* (2013.01); *E05B 17/2049* (2013.01);
(Continued)

(58) Field of Classification Search
CPC ............... E05B 17/2007; E05B 17/203; E05B 17/2038; E05B 17/2049; E05B 17/2057;
(Continued)

(56) References Cited

U.S. PATENT DOCUMENTS 3,771,339 A * 11/1973 Smith ................ E05B 17/2038 70/129
9,394,732 B1 * 7/2016 Ahmad ................ E05B 1/0046
(Continued)

FOREIGN PATENT DOCUMENTS

| | | | |
|---|---|---|---|
| CN | 204701700 | U | 10/2015 |
| CN | 107107977 | A | 8/2017 |
| CN | 109424275 | A | 3/2019 |
| CN | 106114694 | B | 12/2019 |
| DE | 202015101567 | U1 | 4/2015 |
| DE | 202016102422 | U1 | 5/2016 |
| DE | 102015013228 | A1 | 9/2016 |
| DE | 202016104156 | U1 | 9/2016 |

(Continued)

*Primary Examiner* — Christopher J Boswell
(74) *Attorney, Agent, or Firm* — Dickinson Wright PLLC

(57) ABSTRACT

A lock, in particular for an electric bicycle, includes a locking mechanism that has a latch that is movable between a latched position, which is provided for securing a counter-piece movable relative to the locking mechanism, and an unlatched position provided for releasing the counter-piece. The lock includes a blocking device, including a blocking element that is adjustable between a blocking position, in which the latch is blocked in its latched position, and a release position in which the latch is movable into its unlatched position, and a reception unit for receiving a release signal by which the adjustment of the blocking element into the release position can be brought about. A locking system may include at least one such lock.

25 Claims, 10 Drawing Sheets

(51) Int. Cl.
*G07C 9/00* (2020.01)
*E05B 47/00* (2006.01)

(52) U.S. Cl.
CPC ...... *E05B 47/0603* (2013.01); *E05B 47/0657* (2013.01); *G07C 9/00182* (2013.01); *E05B 47/0012* (2013.01); *E05B 2047/0067* (2013.01); *E05B 2047/0086* (2013.01); *G07C 9/00896* (2013.01)

(58) Field of Classification Search
CPC ...... E05B 71/00; E05B 47/0012; E05B 47/06; E05B 47/0603; E05B 47/0657; E05B 47/0661; E05B 47/0673; E05B 2047/0067; E05B 2047/0071; E05B 2047/0086; E05B 2047/0094; E05B 2047/0095; B62H 5/001
See application file for complete search history.

(56) References Cited

U.S. PATENT DOCUMENTS

| | | | | |
|---|---|---|---|---|
| 9,845,618 | B2 * | 12/2017 | Worm | E05B 47/06 |
| 10,370,869 | B2 * | 8/2019 | Yang | E05B 17/10 |
| 10,450,021 | B2 * | 10/2019 | Anuth | B62H 5/147 |
| 10,519,692 | B1 * | 12/2019 | Baird | E05B 15/10 |
| 10,858,864 | B2 * | 12/2020 | Pfunder | E05B 17/2011 |
| 10,946,915 | B2 * | 3/2021 | Prellwitz | E05B 47/00 |
| 11,879,274 | B2 * | 1/2024 | Ku | E05B 71/00 |
| 2018/0362105 | A1 * | 12/2018 | Mori | B62J 50/21 |
| 2019/0031262 | A1 | 1/2019 | Prellwitz | |
| 2020/0023917 | A1 * | 1/2020 | Hu | E05B 17/10 |

FOREIGN PATENT DOCUMENTS

| | | | |
|---|---|---|---|
| DE | 102016119570 | A1 | 4/2018 |
| DE | 102019207115 | A1 | 11/2019 |
| WO | 2016173804 | A1 | 11/2016 |

* cited by examiner

LOCK

CROSS-REFERENCE TO RELATED APPLICATIONS

This application is a U.S. National Stage of International Application No. PCT/EP2021/056563, filed on Mar. 15, 2021, which claims the benefit of German Patent Application No. 10 2020 107 214.7, filed on Mar. 17, 2020, and German Patent Application No. 10 2021 105 647.0, filed on Mar. 9, 2021, all of which are incorporated herein by reference in their entirety.

FIELD

The invention relates to a lock, such as an apparatus for securing an energy store, a frame lock, a brake disk lock or a case lock, in particular for an electric bicycle, said lock comprising a locking mechanism that has a latch that is movable between a latched position, which is provided for securing a counter-piece movable relative to the locking mechanism, and an unlatched position provided for releasing the counter-piece.

BACKGROUND

Such a lock is generally known and is, for example, used to secure an energy store in the region of a luggage carrier or at a frame tube of an electric bicycle against loss or theft. Such an apparatus typically has a lock cylinder that can be actuated by a key. On the actuation of the lock cylinder, a latch is usually moved that secures the energy store in a latched position or releases it in an unlatched position. In this respect, the latch is typically urged into the latched position by a comparatively strong spring element. An accidental movement of the latch into the unlatched position can thus be avoided, for example, also in the presence of vibrations such as arise when riding over uneven terrain. To be able to remove the energy store from the apparatus, for example to perform a charging process, a user must take along a key to unlock the locking mechanism. Similarly, other locks such as frame locks, brake disk locks, locks of a transport case or of a transport box, i.e. case locks, are opened and/or closed by way of a key.

SUMMARY

It is the underlying object of the invention to provide a lock that is characterized by an increased operating comfort, an increased safety, and nevertheless a particularly compact design.

The object is satisfied by a lock, in particular for an electric bicycle, and in particular in that the lock has a locking mechanism that has a latch, wherein the latch is movable between a latched position, which is provided for securing a counter-piece movable relative to the locking mechanism, and an unlatched position provided for releasing the counter-piece. The lock furthermore has a blocking device that comprises a blocking element that is adjustable between a blocking position, in which the latch is blocked in its latched position, and a release position in which the latch is movable into its unlatched position. The lock additionally comprises a reception unit for receiving a release signal by which the adjustment of the blocking element into the release position can be brought about.

The movable counter-piece can, for example, be an energy store or a component of an energy store, or a bolt of a frame lock or of a brake disk lock, or a closing hoop or a catch of a case lock, in each case in particular of an electric bicycle.

The lock can, for example, be an apparatus for securing an energy store, in particular for an electric bicycle, that comprises a locking mechanism that has a latch that is movable between a latched position, in which said latch cooperates with the energy store in a manner securing said energy store, and an unlatched position in which said latch allows the removal of the energy store. The apparatus additionally has a blocking device that comprises a blocking element that is adjustable between a blocking position, in which the latch is blocked in its latched position, and a release position in which the latch is movable into its unlatched position. In this respect, the blocking device comprises a reception unit for receiving a release signal by which the adjustment of the blocking element into the release position can be brought about.

The invention therefore overall provides two securing or release steps to secure the energy store in the apparatus or to remove it therefrom. On the one hand, the locking mechanism directly secures the energy store by way of the latch and, on the other hand, a blocking element blocks the locking mechanism in the latched position so that an actuation of said locking mechanism is only possible after the adjustment of the blocking element into the release position. An increased protection against loss is thus ensured since an accidental movement of the latch into the unlatched position, for example when riding over rough terrain, is all the more effectively prevented by the blocking element. The protection against an unauthorized removal or theft of the energy store can also be increased by the apparatus in accordance with the invention. In addition, a more flexible design of the securing process or removal process is possible, wherein a keyless operation of the locking mechanism can in particular be provided: For example, the locking mechanism can be manually unlockable after the blocking device has been brought into the release position by receiving a release signal. A direct increase in the operating comfort is the result since a physical key no longer has to be taken along for the unlocking.

Such an apparatus can, for example, be used to secure a battery or an accumulator at an electric vehicle, in particular at an electric bicycle, an electric wheelchair, an electric scooter, or an electric kart. In this respect, the apparatus can in turn be attached to any desired suitable point of the electric vehicle.

The lock can further be a frame lock, a brake disk lock, a lock of a transport case or of a transport box, i.e. a case lock, in particular of an electric bicycle, an electric wheelchair, an electric scooter, or an electric cart. The lock can, for example, be locked by way of a latch configured as a ball, a roller, a pin, a hoop, or a catch. A counter-piece, which can be attached to the lock itself, to the frame, to the brake disk, to the electric vehicle or to the case, can be brought into engagement with the locking mechanism in the locked state so that a removal of the counter-piece from the lock and thus an opening of the lock are prevented.

In accordance with the invention, two securing or release steps are also provided for such a lock to open or close the lock, wherein, in the latched position, the locking mechanism holds the lock closed by way of the latch, whereas the blocking element blocks the locking mechanism so that an actuation thereof, and thus an opening of the lock, is only possible after the adjustment of the blocking element into the release position. This is accompanied by an increased protection against an unintentional opening of the lock and against an unauthorized opening or theft, while a keyless operation increases the operating comfort.

The blocking element can be adjusted into its blocking position after the closing of the latch. The adjustment of the blocking element can be triggered by information of a sensor device, by the elapse of a certain period of time, or by a blocking signal. A sensor device can be provided to detect the presence of the counter-piece in the lock and/or the presence of a mobile end device of a user.

For example, after the insertion of the energy store into the apparatus, an adjustment of the blocking element into its blocking position can take place. A sensor device for detecting an energy store can, for example, be included in the apparatus so that an automatic adjustment of the blocking element into the blocking position takes place on the recognition of an inserted energy store. Provision can also be made that the blocking element is adjusted into the blocking position by the blocking device after the elapse of a certain period of time from an actuation of the latch. Provision can alternatively or additionally be made that a blocking signal, which is, for example, transmitted by a user to the reception unit of the blocking device, triggers the adjustment of the blocking element into the blocking position. The blocking device can also be configured to recognize a mobile end device of a user by way of the reception device. In this case, an adjustment of the blocking element into the blocking position can, for example, also take place as soon as the contact with the mobile end device is aborted, e.g. when said mobile end device moves out of the reception region of the blocking device.

The blocking element can be of latch-like or bolt-like design. For example, the blocking element can comprise a pin, in particular composed of metal. Alternatively or additionally, the blocking element can comprise at least one ball, one flattened ball, or one roller.

The blocking element can advantageously be arranged such that it is covered and not accessible from the outside when the lock is closed and/or locked. The blocking element or the blocking device can in particular be arranged in the apparatus for securing an energy store such that, when the energy store is used, the blocking device is covered by the energy store and is thus not accessible from the outside. An unauthorized manipulation of the blocking device can thereby be made more difficult.

In accordance with an embodiment, the blocking device comprises an actuator, in particular an electromechanical or electromagnetic actuator, for adjusting the blocking element. A correspondingly designed blocking element can thus be electrically adjusted between the release position and the blocking position, which makes a manual adjustment by a user unnecessary and thus contributes to an increase in the operating comfort. Since only the blocking element, but not the locking mechanism, is actuated by the actuator, an actuator with low power can already be sufficient for adjusting the blocking element so that, for example, an electric motor actuator having compact dimensions can advantageously be used. An electromagnetic actuator can also be provided that acts on the blocking element by way of magnetic force in order to block the locking mechanism in the latched position.

The reception unit and the release signal to be received can be formed in a variety of ways. For example, a wired design of the reception unit as a control button that can be actuated by a user is conceivable, with the actuation of the button corresponding to the release signal.

The reception unit can be configured for a wireless signal reception and can in particular have a Bluetooth module, an RFID module, and/or a WLAN module. The reception unit can thus wirelessly receive a release signal which a user, for example, transmits by way of a mobile end device, in particular when he approaches the apparatus. In this way, the blocking device can advantageously be actuated in a keyless manner. The transmission of the release signal can in this respect either take place actively through a user input at the mobile end device or through an automated protocol that transmits the release signal without a user input after the detection of the apparatus. Furthermore, the reception unit can also be configured to transmit data so that data can be exchanged between the apparatus and the mobile end device of the user and optionally with further electronic devices.

The blocking device can comprise an authentication module for authenticating a received release signal. Thus, an authorized user can be authenticated and the blocking device can, for example, only be activated and the blocking element can only be adjusted into the release position in the case of a positive result of the authentication. For example, the authentication module can be configured for a wireless authentication of a user, in particular by way of an exchange of electronic keys via Bluetooth, WLAN, RFID, or other known methods. A wired authentication at the apparatus or at the electric vehicle itself is also conceivable, for example by way of a fingerprint sensor, PIN input, or by way of another method, in particular a biometric method.

The locking mechanism can have an actuation mechanism for a manual movement of the latch into the unlatched position. On the one hand, a lock cylinder and an associated key can be provided as the actuation mechanism. On the other hand, at least one actuation mechanism that can be actuated in a keyless manner can be provided for a manual movement of the latch into the unlatched position to increase the operating comfort.

The latch can be displaceably and/or rotatably supported.

Furthermore, a rotary and/or translatory actuation movement can be provided for moving the latch. For example, the actuation mechanism can comprise a push button and/or a slider for transmitting a linear actuation movement to the latch in order to move said latch between the latched position and the unlatched position. Alternatively to a pushing, a pulling can also be provided at the actuation mechanism. The movement can be transmitted directly to the latch or it can also be converted into a movement of the latch by way of a gear, in particular by way of a slot guide, a control slope, a connecting rod, or generally by way of an articulated connection. The movement of the latch can differ in direction and/or magnitude from the actuation direction of the actuation mechanism. The actuation mechanism can further comprise a lever by whose actuation a movement of the latch into the unlatched position takes place. The movement of the latch produced by actuating the actuation mechanism can comprise a pivoting, a rotation, or a displacement of the latch, or a combination thereof. For example, a pivoting or a rotation of the latch about one or more axes can be provided and additionally a pivoting or a rotation of the actuation mechanism or of a part thereof about another axis.

The latch can additionally have a free stroke function which makes it possible to push the latch into the unlatched position, for example on the insertion of the counter-piece into the lock, without the actuation mechanism also being actuated.

Alternatively or additionally, the actuation mechanism can comprise a handle, e.g. a lever, a rotary knob or a rotary handle, and a torque transmission element for transmitting a torque from the handle to the latch, in particular by way of an eccentric element connected between the torque transmission element and the latch. The torque transmission element can, for example, be at least substantially cylindrical and rotatable by way of the handle. The torque generated by the rotation of the torque transmission element can be converted by way of an eccentric element into a linear movement of the latch between the latched position and the unlatched position. The handle is advantageously designed such that a user can easily apply the necessary force to move the latch. The handle can, for example, comprise a rotary handle. For example, a rotary lever movement can also be translated into a linear movement of the latch.

In order to block the latch in the latched position, the blocking element can be brought into engagement with the locking mechanism, in particular with the actuation mechanism, with a gear element, with a torque transmission element, and/or with the latch itself. For this purpose, an element of the locking mechanism can have a recess into which the blocking element engages in the blocking position. For example, a bore can be provided in the torque transmission element and can receive the blocking element in the blocking position so that an actuation, in particular a rotation, of the torque transmission element is prevented by the blocking element. Accordingly, a translatory actuation of the locking mechanism can also be prevented by the blocking element which is in particular at least partly received in the recess.

An adjustment of the blocking element between the blocking position and the release position can comprise a linear movement of the blocking element, in particular along a longitudinal axis of the blocking element. If the blocking element is, for example, pin-like, latch-like or bolt-like, it can at least sectionally have a thread, it can be configured as a gear rack, or it can have an eccentric device so that a rotary movement of an actuator, for example of an electric motor coupled to the blocking element, can be converted into a linear movement of the blocking element, in particular along its longitudinal axis.

If the blocking element is spherical or roller-shaped, a translational movement, in particular a linear translational movement, of the blocking element can be provided to move it between the blocking position and the release position. In the case of a roller-shaped or cylindrical blocking element, the translational movement can in particular take place in parallel with a base surface of the roller or of the cylinder. The movement of the blocking element can be generated directly by the actuator or, alternatively, it can be transmitted indirectly to the blocking element via an eccentric element, a slider, or a similar apparatus.

Alternatively or additionally, an adjustment of the blocking element between the blocking position and the release position can comprise a rotational movement and/or a translational movement of the blocking element. For example, the adjustment of the blocking element can comprise a pivoting, a rotation, or a displacement of the blocking element, or a combination thereof.

In accordance with an embodiment, the latch of the locking mechanism is provided to engage, in its latched position, into a recess of the energy store. For example, a boundary surface of the energy store can have a corresponding opening for the passing through of the latch so that the energy store is secured in the securing apparatus by the latch that is in the latched position. Alternatively or additionally, in its latched position, the latch can, for example, engage behind a projection of the energy store such that the removal of the energy store is blocked.

Similarly, in its latched position, the latch can engage into or engage behind a recess of the counter-piece to prevent a removal of the counter-piece from the locking mechanism, i.e. to prevent the opening of the lock. Conversely, the latch itself can have a recess into which a corresponding structure of the counter-piece or of the energy store can engage in the latched position.

The latch can be brought from the latched position into the unlatched position against a restoring force of a spring so that an accidental release of the counter-piece, e.g. an accidental release of the energy store, is prevented. The restoring force generated by the spring is advantageously so large that an accidental movement of the latch into the unlatched position is also effectively prevented in view of vibrations occurring during travel operation and in view of the weight of the energy store. Furthermore, an automatic latching in of the energy store on the insertion into the apparatus can thereby be possible. Also in connection with a frame lock, a brake disk lock or a case lock, the latch can be brought from the latched position into the unlatched position against the restoring force of a spring so that an accidental opening is prevented and an automatic locking on the closing is made possible. Such a return spring can alternatively or additionally be arranged at the actuation mechanism.

In accordance with a further embodiment, the lock has an emergency release mechanism for unlocking the locking mechanism when the blocking element is in the blocking position. The emergency release mechanism can enable a removal of the counter-piece from the locking mechanism, i.e. an opening of the lock, even when the blocking element is in the blocking position.

A movement of the latch and a removal of the energy store can hereby also take place when, for example, a malfunction of the blocking device is present or the user cannot transmit the necessary release signal to the blocking device, for example, because he is not currently taking along a required mobile end device or its battery is flat.

The emergency release mechanism can comprise a lock cylinder for an unlocking of the locking mechanism by way of a key. The lock cylinder can, for example, be arranged coaxially with a torque transmission element of the locking mechanism and can in particular act on the same device for moving the latch, in particular on the same eccentric element, as the torque transmission element. The lock cylinder can be arranged on a side of the latch disposed opposite the torque transmission element.

The emergency release mechanism can furthermore comprise a coupling device that is connected between the blocking device and the latch and that is configured to allow a movement of the latch when the emergency release mechanism is actuated despite the blocking element being in the blocking position. The coupling device in particular separates the blocking device from the latch on the actuation of the emergency release mechanism. In this respect, the coupling device can generally be arranged at any desired point in the effective link between the latch and the blocking device. Alternatively or additionally, the coupling device can connect the emergency release mechanism to the latch provided that they are generally separate from one another.

Two coupling elements can be provided for this purpose, wherein the first coupling element can be connected between the latch and the blocking device and the second coupling element can be connected between the latch and the emergency release mechanism. The first coupling element can connect the latch to the actuation mechanism and to the blocking device on a regular actuation of the apparatus by way of an actuation mechanism of the locking mechanism. At the same time, the second coupling device can separate the emergency release mechanism, in particular a lock cylinder of the emergency release mechanism, from the latch when a regular actuation of the locking mechanism takes place.

A further aspect of the invention relates to a locking system comprising at least one lock as described above; an energy supply; and a central unit.

The at least one lock, the energy supply, and the central unit can each be arranged spatially separate from one another. The reception unit of the blocking device can in particular also be arranged spatially separate from the lock. A plurality of components of the locking system can also be arranged grouped with one another. For example, an energy supply, an actuator of the blocking device, and an associated lock can be arranged in a common housing, in particular in a housing of the lock.

The locking system can comprise a plurality of locks, for example, an apparatus for securing an energy store and one or more further locks such as a frame lock and a case lock. They can each be attached at a suitable point to an electric vehicle, in particular each in their own housing. At least one lock has a blocking element, as described above. The other locks can be electrically actuable locks without a blocking element. Alternatively, a plurality of or all of the locks can have a blocking element.

The energy supply can supply the at least one lock and/or the central unit with energy. The central unit can in particular have a separate battery. An energy store that can be secured in the apparatus for securing an energy store can simultaneously serve as an energy supply for the locking system and can therefore in particular also supply the at least one lock and/or the central unit with energy. Alternatively or additionally, the locking system can have at least one separate battery. Said battery can be associated with a specific lock or with a plurality of locks. If applicable, the battery can be arranged in a common housing with a lock associated with it. The battery can be arranged spatially separate from the at least one lock.

Each lock has a reception device. If a plurality of locks are part of the locking system, their reception units can be centrally arranged and can in particular be accommodated in a common control device. In a simple case, the reception device can form a switch that controls an actuator, in particular the actuator of a blocking device, of the at least one lock. The reception unit can in particular switch the actuator on or off in dependence on the presence of a corresponding release signal, wherein the connection between the actuator and the reception unit can take place unencrypted via a control line.

The reception unit can be configured to receive control commands, such as a release signal, from the central unit. The reception unit can further be configured to monitor the state of the lock and/or of a counter-piece of the lock to be secured. The reception unit can be arranged in a common housing with a lock associated with it and with the associated actuator. Thus, a manipulation of the control line can, for example, be mechanically prevented.

The central unit of the locking system can be configured to represent a secret code of the locking system toward the outside. A plurality of locks can be controlled by a central unit. The central unit can in particular be configured to receive a closing command or an opening command from a user, for example via a radio connection or another wireless connection such as Bluetooth, WLAN, RFID, via a mechanical key, and/or via a display or an input field, for example via a PIN input.

The central unit can have an authentication module. An authorized user can be authenticated by way of the authentication module and a release signal can only be forwarded to the at least one reception unit in the case of a positive result of the authentication. For example, the authentication module can be configured for wireless authentication of a user, in particular by way of an exchange of electronic keys via Bluetooth, WLAN, RFID, or other known methods. A wired authentication at the central unit or at the electric vehicle itself is also conceivable, for example by way of a fingerprint sensor or by way of another method, in particular a biometric method.

The same secret code can in each case be provided for a plurality of locks. If a valid closing or opening command is present, the central unit can transmit a corresponding control command to the at least one reception unit. The central unit can request the secret code again on each locking or opening process and in particular for each lock of the locking system. Alternatively, the central unit itself can be unlocked once and can store this state until revoked. In this case, the actuation of all the locks can be released by the central unit. For this purpose, the central unit can transmit release signals to all the locks automatically or at the request of a user and without a further inquiry about the secret code. After its use, the central unit can be blocked again. The blocking can, for example, take place after the elapse of a certain period of non-use or through a user input at the central unit, for example via a display.

For example, one group of locks of the locking system can have a common secret code, while another group of locks of the same locking system can have a different common secret code. Thus, each group can be actuated separately by inputting the associated secret code.

The central unit can be formed by an on-board computer of an electric vehicle. A mobile end device of a user, for example a smartphone, can also serve as a central unit. Optionally, the central unit can monitor the state of the electric vehicle, for example, a standstill or a movement of the electric vehicle, an open or closed state of a lock. This can in particular take place by way of suitable sensors located inside or outside the central device or by inquiring about the state of other systems, for example of the drive motor. Provision can be made that the central unit transmits feedback about the determined state, in particular warnings or error messages, to the user.

The connection between the central unit and the at least one reception unit can either take place in a wired manner via a signal line or wirelessly, for example via radio, WLAN, or Bluetooth. The signal can be transmitted in encrypted form if required. Access to a signal line can be mechanically prevented in that it is laid in an inaccessible manner in the electric vehicle, for example in a frame of an electric bicycle. The communication can take place in two directions. For example, the central unit can transmit control commands to the reception unit and the reception unit can transmit information on the lock or the apparatus for securing an energy store to the central unit.

BRIEF DESCRIPTION OF THE DRAWINGS

The invention will be described in the following purely by way of example with reference to a possible embodiment and to the enclosed drawings, in which.

DETAILED DESCRIPTION

Figure 1:
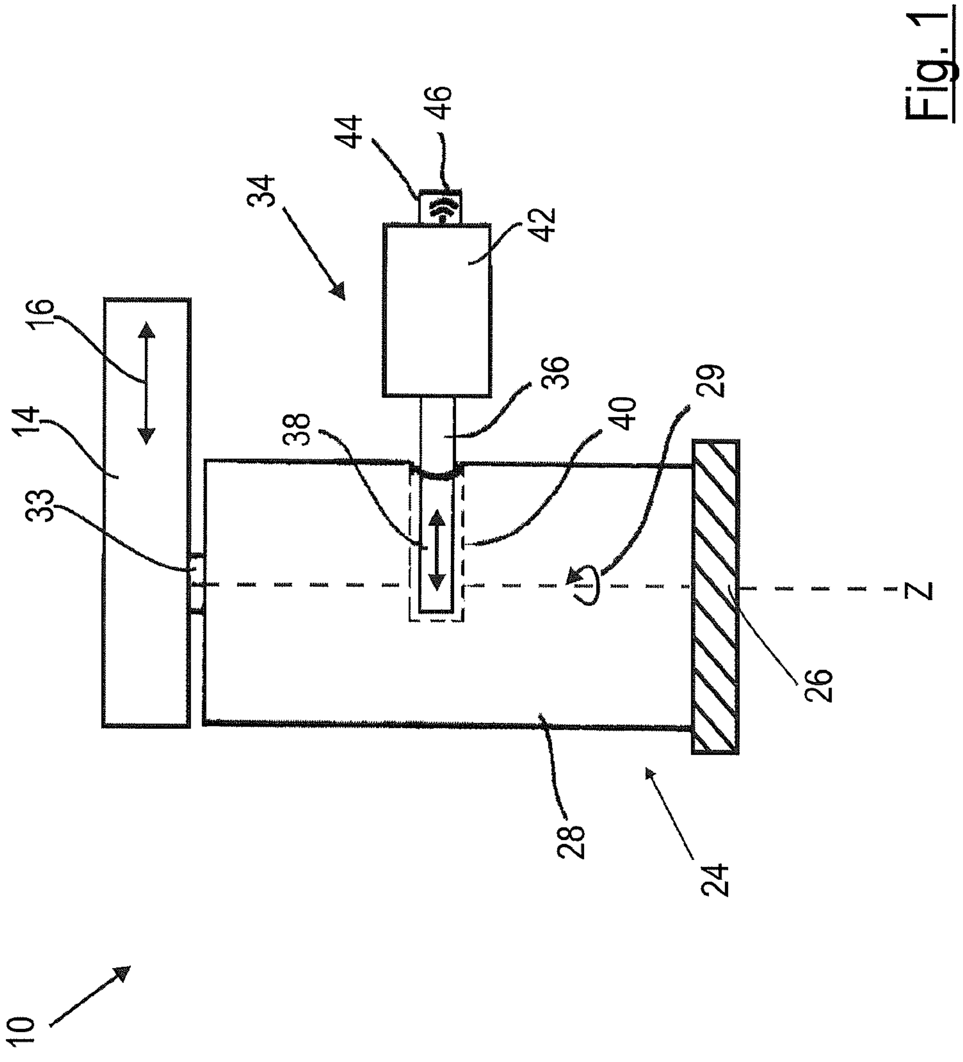
FIG. 1 is a plan view of a lock in accordance with a first embodiment.

A first embodiment of a lock, namely an apparatus 10 for securing an energy store 12 (see FIG. 2), in particular for an electric bicycle (not shown), is shown in FIG. 1. With the apparatus 10 shown, an energy store 12 should in principle be fastenable to the electric bicycle in a manner secure against loss and theft, wherein the energy store 12 should be removable from the apparatus 10 by an authorized user, for example, to perform a charging process.

The apparatus 10 has a locking mechanism that has a latch 14 that is movable between a latched position and an unlatched position, as is indicated by an arrow 16. In the latched position shown in FIG. 1, the latch 14 is extended so that it can cooperate with the energy store 12 in a manner securing it. As can be recognized in FIG. 2, in the latched position, the latch 14 engages into a corresponding recess 18 (shown by dashed lines) of the energy store 12 and thus blocks a removal of the energy store 12 from the apparatus 10.

Figure 2:
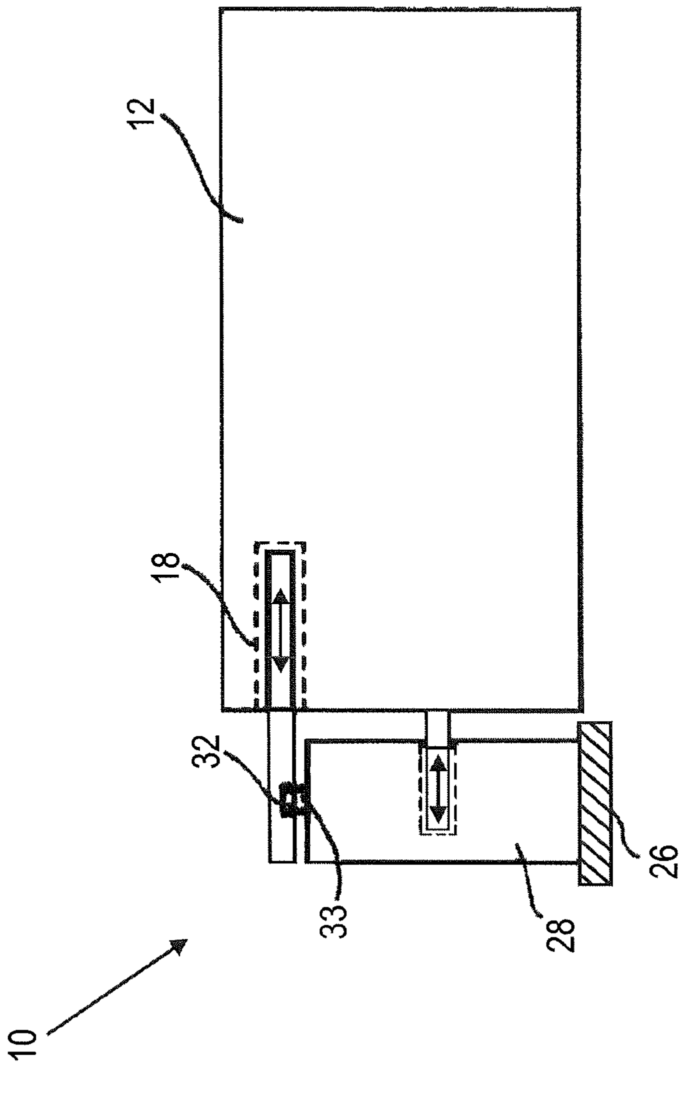
FIG. 2 is a plan view of the lock of FIG. 1 with an inserted energy store.
Figure 3:
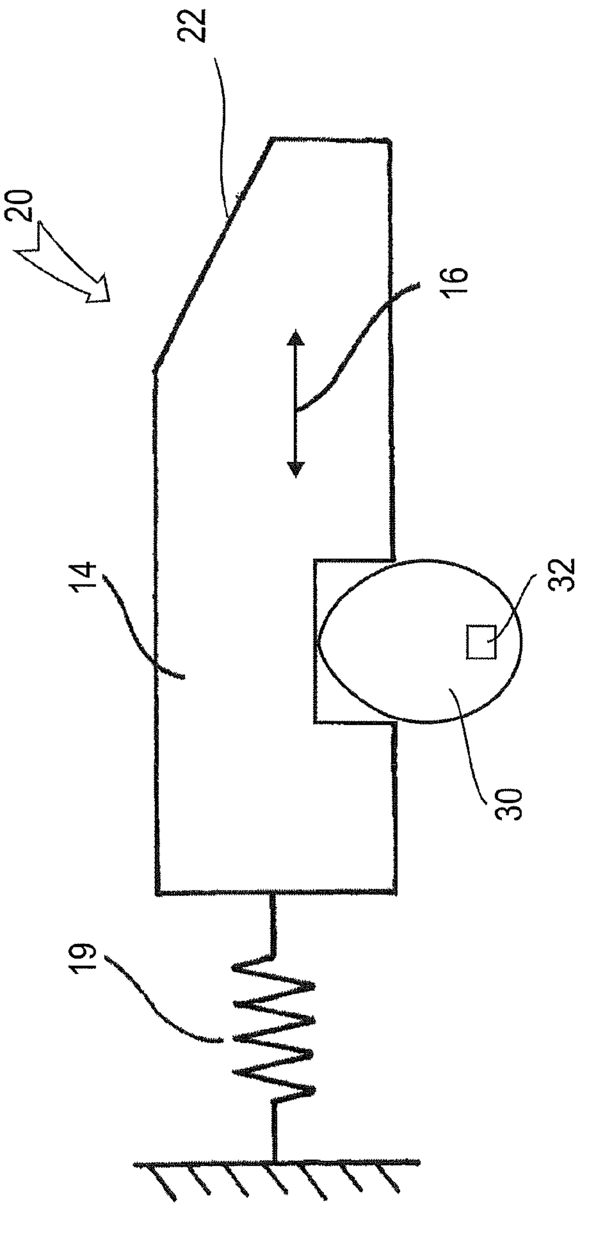
FIG. 3 is a sectional view of a locking mechanism of the lock of FIG. 1 in the region of a latch.

The latch 14 is preloaded by a spring 19 that urges it into the latched position (see FIG. 3). A movement of the latch 14 into the unlatched position thus takes place against the restoring force of the spring 19. Thus, the energy store 12 can, for example, be latched into the apparatus 10 in that the latch 14 is urged back so far against the restoring force of the spring 19 by the energy store 12, which is inserted in the direction of the arrow 20 (see FIG. 3), by way of a chamfered cam surface 22 until the latch 14 can engage into the recess 18 of the energy store 12, whereupon the latch 14 is in turn brought back into the latched position, as is shown in FIG. 2, by the spring 19.

To remove the energy store 12 from the apparatus 10, the latch 14 is movable into the unlatched position. For this purpose, the locking mechanism has actuation mechanism 24 for a manual movement of the latch 14 into the unlatched position (FIG. 1). The actuation mechanism 24 comprises a handle 26 and a torque transmission element 28 for transmitting a torque from the handle 26 to the latch 14. In the embodiment shown, the handle 26 is configured as a rotary handle that is rotationally fixedly connected to the torque transmission element 28. Here, the torque transmission element 28 is designed as a cylinder that is rotatable about its longitudinal axis Z by way of the rotary handle 26, as is indicated by the arrow 29 in FIG. 1.

An eccentric element 30 is connected between the torque transmission element 28 and the latch 14, as is shown in FIG. 3, to transmit a torque from the handle 26 or from the torque transmission element 28 connected thereto. A square opening 32 in the eccentric element 30 serves for the reception of a shaft 33 arranged along the longitudinal axis Z of the torque transmission element 28 (FIGS. 1, 2) and ensures that a rotation of the torque transmission element 28 is transmitted to the eccentric element 30, whereby a linear movement of the latch 14 along the arrow 16 between the latched position and the unlatched position can be brought about. Thus, the locking mechanism of the apparatus 10 for securing an energy store 12 can be manually actuated by a turning at the handle 26 without the use of a key being necessary.

Furthermore, the apparatus 10 comprises a blocking device 34 comprising a blocking element 36 (FIG. 1). The blocking element 36 is adjustable in the direction of the arrow 38 between a blocking position and a release position. In the blocking position, the blocking element 36 is configured to block the locking mechanism in its locked state so that a movement of the latch 14 into the unlatched position is impossible. For this purpose, in its blocking position, the blocking element 36 is in engagement with the locking mechanism or with at least a part of the locking mechanism.

In FIG. 1, a pin-like blocking element 36 is shown that can be brought into engagement with the torque transmission element 28 of the locking mechanism. For this purpose, the torque transmission element 28 has an opening 40 into which the pin-like blocking element 36 can engage in the blocking position so that a rotation of the torque transmission element 28 and thus of the handle 26 is prevented. Thus, a manual actuation of the locking mechanism is impossible and the latch 14 is blocked in the latched position. Alternatively or additionally, the blocking element 36 can be brought into engagement with the handle 26 to block the locking mechanism in its locked state.

If in FIG. 1 the blocking element 36 is moved along the direction of the arrow 38 so far out of the opening 40 of the torque transmission element 28 that it moves out of engagement with the locking mechanism and a rotation of the torque transmission element 28 is possible again, the blocking element 36 is in its release position. The latch 14 can now be moved back into the unlatched position by the actuation mechanism 24.

To adjust the blocking element 36, the blocking device 34 comprises an electromechanical actuator 42, here an electric motor. In the present embodiment, the adjustment of the blocking element 36 between the blocking position and the release position comprises a linear movement of the blocking element 38 along a longitudinal axis of the blocking element 36 represented by the arrow 38. The conversion of a rotational movement of the electromechanical actuator 42 into a linear movement of the blocking element 36 can, for example, be achieved by way of a spindle drive or a rack and pinion drive, wherein the principles of such drives are known and are therefore not stated in detail here.

The adjustment of the blocking element 36 into the release position by the actuator 42 can be brought about by a release signal. To receive the release signal, the blocking device 34 has a reception unit 44. In accordance with the embodiment shown, the reception unit 44 is configured for a wireless signal reception. For this purpose, it can selectively comprise one or more modules for a wireless reception and/or transmission of data, for example a Bluetooth module, an RFID module, or a WLAN module. The blocking device 34 additionally has an authentication module 46 for authenticating a received release signal. In the present embodiment, the authentication module 46 is integrated into the reception unit 44. The reception unit 44 is thus configured to exchange electronic keys with a mobile end device of a user, for example by way of WLAN, Bluetooth, and/or RFID.

The mode of operation of the apparatus 10 shown in FIGS. 1-3 can also be integrated in a lock 100, such as a frame lock or a case lock. This equally applies to the embodiments shown in FIGS. 4-6.

Figure 4:
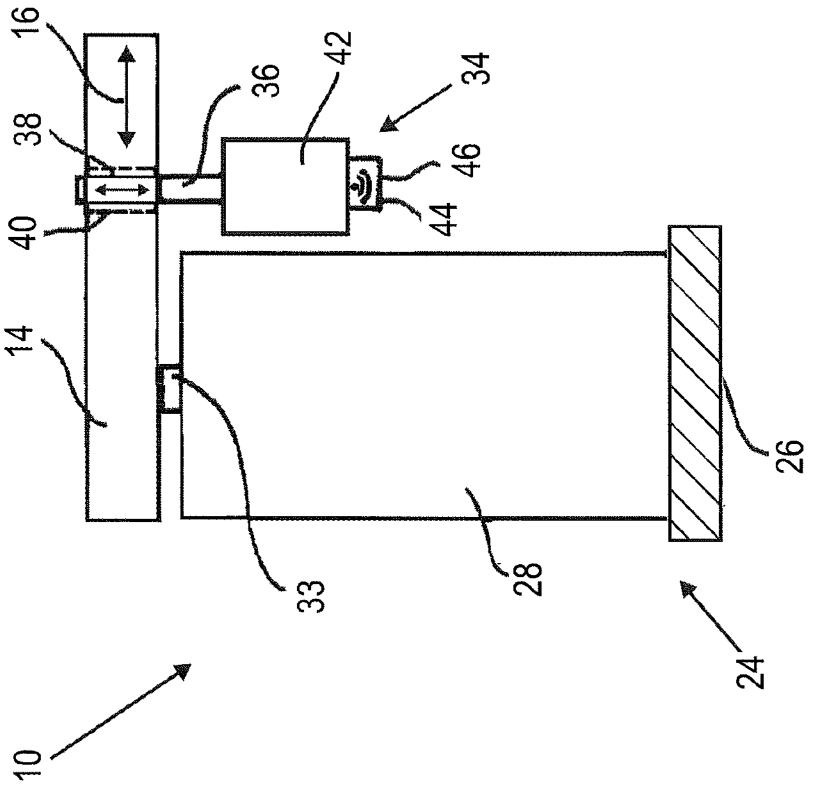
FIG. 4 is a plan view of a lock in accordance with a second embodiment.

FIG. 4 shows a second embodiment of an apparatus 10 that is similar in large parts to the first embodiment from FIG. 1. The apparatus 10 in accordance with the second embodiment also comprises a blocking device 34 comprising a blocking element 36 that is adjustable in the direction of the arrow 38 between a blocking position, as shown in FIG. 4, and a release position. In contrast to the first embodiment, in order to block the locking mechanism, i.e. in order to prevent a movement of the latch 14 into the unlatched position, the blocking element 36 is, however, not brought into engagement with the actuation mechanism 24 of the locking mechanism, but rather with the latch 14 itself.

Figure 5:
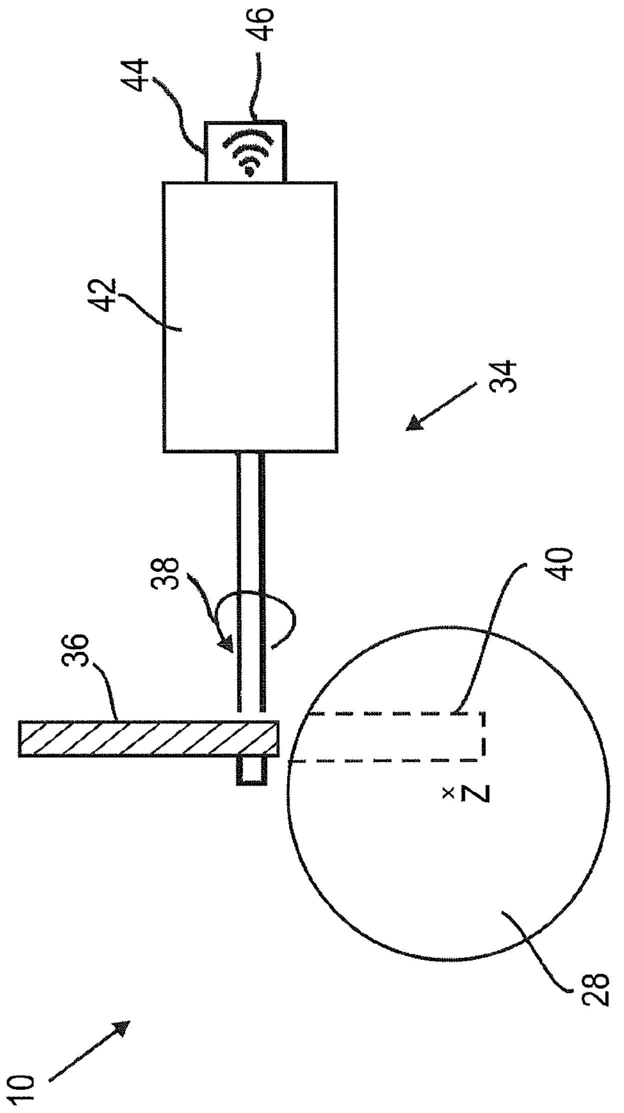
FIG. 5 is a sectional view of a lock in accordance with a third embodiment in the region of a blocking element.

FIG. 5 shows a sectional view along a plane perpendicular to the longitudinal axis Z of the torque transmission element 28 of a third embodiment of an apparatus 10 that is likewise largely in agreement with the first embodiment of FIG. 1. However, in the present embodiment, the blocking element 36 is rotatably arranged to block the locking mechanism by way of an electric motor 42. FIG. 5 shows the blocking element 36 in its release position in which a rotation of the torque transmission element 28 and thus a movement of the latch 14 into the unlatched position are possible. The blocking element 36 shown in cross-section here can be pin-like or disk-shaped and, in the latter case, it can, for example, have the shape of a quarter circle or semicircle. An adjustment of the blocking element 36 between the release position shown and the blocking position comprises a rotational movement of the blocking element 36 along the direction of the arrow 38. Due to the rotation, the blocking element 36 is rotated into a gap-shaped opening 40 of the torque transmission element 28 corresponding thereto. In this situation, a rotation of the torque transmission element 28 about its longitudinal axis Z is prevented by the blocking element 36 and the locking mechanism is blocked in the latched position.

Figure 6:
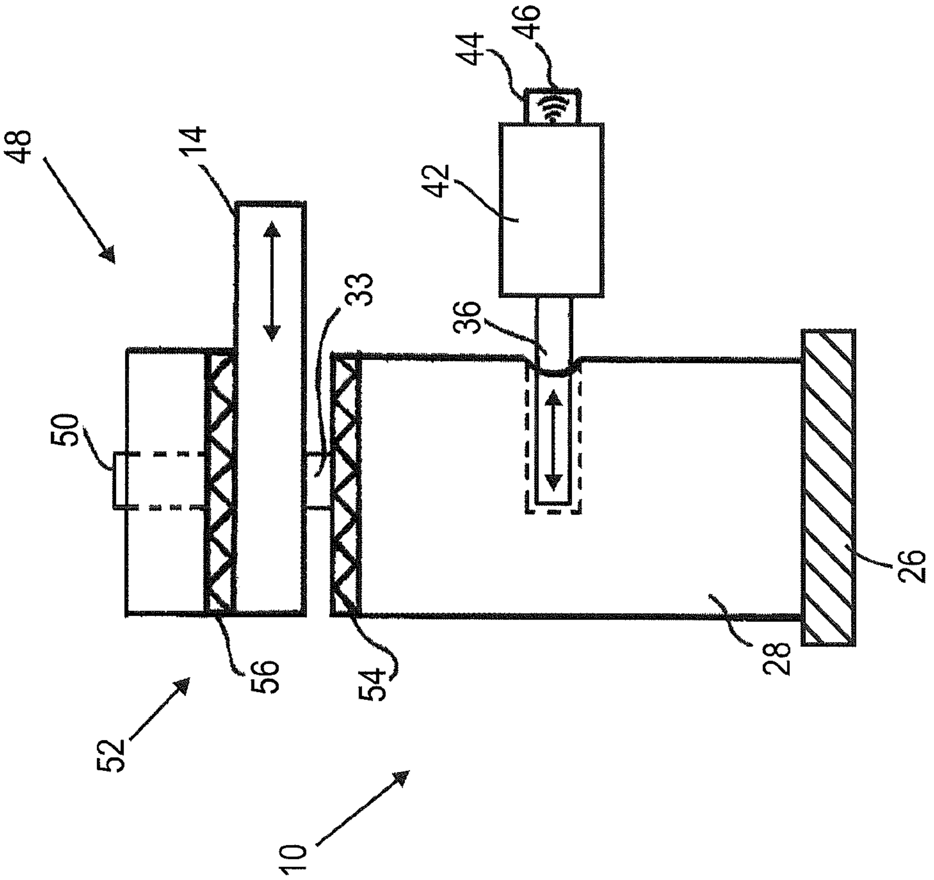
FIG. 6 is a plan view of a lock in accordance with a fourth embodiment.

FIG. 6 shows an apparatus 10 in accordance with a fourth embodiment. The apparatus 10 corresponds in large parts to the first embodiment of FIG. 1. In addition, the apparatus 10 of FIG. 6 has an emergency release mechanism 48 that also allows an unlocking of the locking mechanism when the blocking element 36 is in the blocking position. Thus, an energy store 12 can even be removed from the apparatus 10 when the regular adjustment of the blocking element 36 into the release position is not supposed to work, for example, if there is a malfunction of the blocking device 34 or if the authentication of an authorized user is not possible, for example because the user does not have his mobile end device at hand for transmitting a release signal or the battery of the mobile end device is empty.

The emergency release mechanism 48 has a lock cylinder 50 that allows a mechanical and manual unlocking of the locking mechanism by way of an associated key and thereby also functions independently of a power supply of the actuator 42. To enable a movement of the latch 14 by the emergency release mechanism 48 even though the blocking element 36 is in the blocking position, the latch 14 has to be decoupled from the blocking device 34. For this purpose, the emergency release mechanism 48 shown here has a coupling device 52.

In accordance with the embodiment shown, the coupling device 52 comprises two coupling elements 54, 56. The first coupling element 54 is connected between the latch 14 and the torque transmission element 28 and is thus connected into the effective line between the latch 14 and the blocking device 34. During the regular use of the apparatus 10 by way of the actuation mechanism 24, said first coupling element 54 connects the latch 14 to the torque transmission element 28 and thus allows the transmission of a torque from the handle 26 to the latch 14. The first coupling element 54 is additionally configured to separate the latch 14 from the torque transmission element 28 on the actuation of the emergency release mechanism 48. Since the torque transmission element 28 is blocked by the blocking element 36 in the embodiment shown, the separation of the latch 14 from the torque transmission element 28 enables a movement of the latch 14 even though the blocking element 36 is in the blocking position. Thus, an unlocking of the locking mechanism and a removal of the energy store 12 from the apparatus 10 can take place non-destructively even if the blocking element 36 blocks the locking mechanism in the latched position.

A second coupling element 56 is connected between the lock cylinder 50 and the latch 14. It is configured to connect the latch 14 to the lock cylinder 50 on the actuation of the emergency release mechanism 48 so that the latch 14 can be moved into the unlatched position by way of a key. On the regular actuation of the apparatus 10, the lock cylinder 50 is separated from the latch 14 by the second coupling element 56 so that a movement of the latch 14 can take place independently of an actuation of the lock cylinder 50.

The coupling device 52 can in particular be designed such that the second coupling element 56 is generally open and the first coupling element 54 is coupled in. If a suitable key (not shown) is inserted into the lock cylinder 50 of the emergency release mechanism 48, the first coupling element 54 is opened and the second coupling element 56 is coupled in so that an unlatching of the latch 14 by way of the emergency release mechanism 48 can take place.

FIGS. 7A-D represent a fifth embodiment of an apparatus 10 for securing an energy store, wherein the mode of operation of the locking mechanism and of the blocking device 34 of this apparatus 10 can equally be used in a lock 100.

Figure 7B:
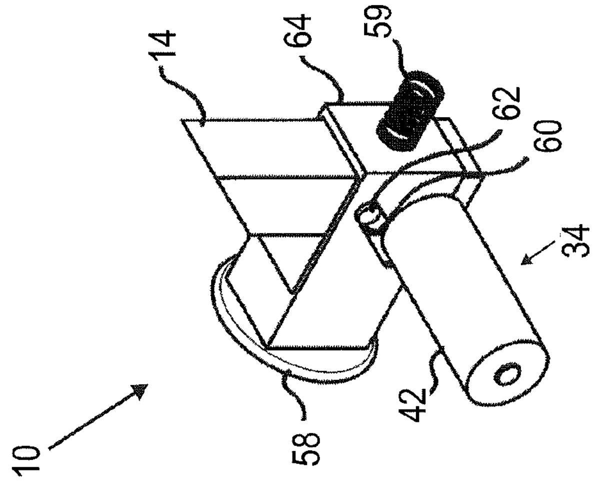
FIG. 7B is a further perspective view of the lock in accordance with FIG. 7A in the latched position.
Figure 7A:
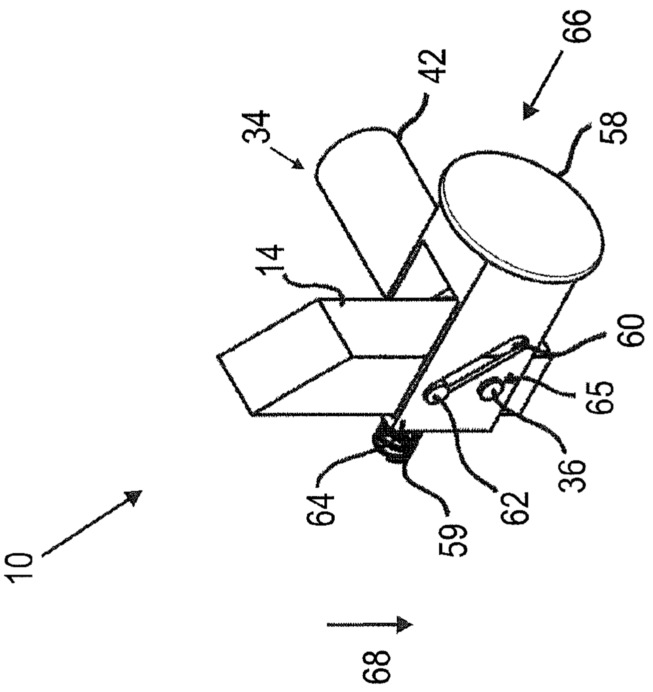
FIG. 7A is a perspective view of a lock in a latched position in accordance with a fifth embodiment.
Figure 7D:
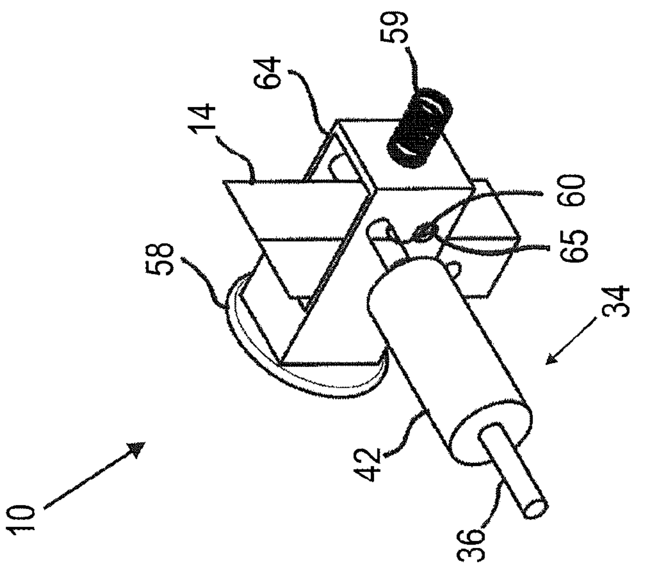
FIG. 7D is a further perspective view of the lock in accordance with FIG. 7A in the unlatched position.
Figure 7C:
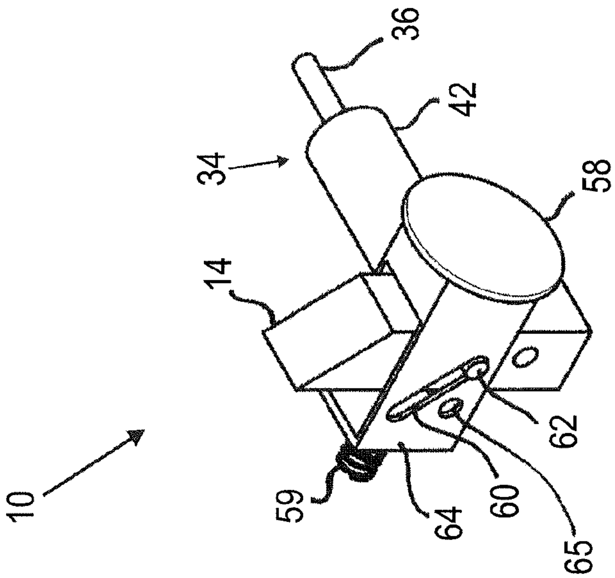
FIG. 7C is a perspective view of the lock in accordance with FIG. 7A in an unlatched position.

The apparatus 10 in accordance with the fifth embodiment also comprises a blocking device 34 having a pin-like blocking element 36 that is linearly adjustable along its longitudinal axis between a blocking position shown in FIGS. 7A, 7B and a release position shown in FIGS. 7C, 7D. An electromechanical actuator 42 is in turn provided to adjust the blocking element 36.

The apparatus 10 further comprises a locking mechanism having a latch 14. A movement of the latch 14 from its latched position in accordance with FIGS. 7A, 7B into its unlatched position in accordance with FIGS. 7C, 7D takes place in the fifth embodiment by way of actuation mechanism comprising a push button 58. Thus, in contrast to the first embodiment, the latching or unlatching of the latch 14 is not produced by a rotational movement, but by a translational movement of the actuation mechanism. To convert a pressure on the push button 58 into a movement of the latch 14, the latch 14 is guided by way of pins 62 in a slotted part 60 that is arranged obliquely to the press-in direction of the push button 58 and that is formed in a frame 64 that surrounds the latch 14 and that is connected to the push button 58. As is indicated in FIG. 7A, a linear press-in movement of the push button 58 along the arrow 66 is converted by the slotted part 60 into a linear movement of the latch 14, oriented perpendicular thereto, along the arrow 68 into its unlatched position. The push button 58 is preloaded by way of a spring 59 into its non-pressed-in position that corresponds to the latched position of the latch 14.

In accordance with the fifth embodiment, in order to prevent an unintentional movement of the latch 14 into the unlatched position, the blocking element 36 is brought into engagement, in the latched position, with both the latch 14 and the push button 58, specifically with a recess 65 in the frame 64 connected to the push button 58. A pressing in of the push button 58 and a movement of the latch 14 into the unlatched position are thus effectively prevented.

If the blocking element 36 is moved into its release position by the actuator 42 (FIGS. 7C, 7D), it is no longer in engagement with the latch 14 and the frame 64 so that a pressing in of the push button 58 and an unlatching of the latch 14 are possible.

Figure 8:
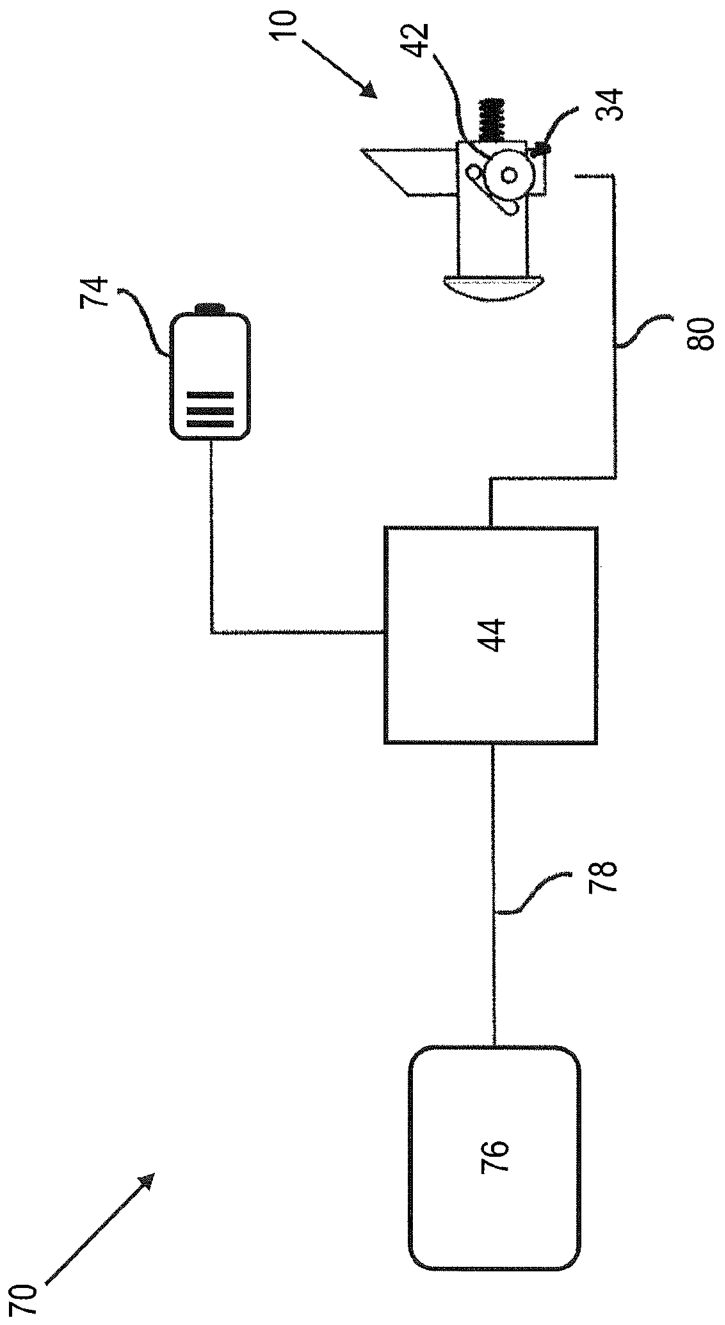
FIG. 8 is an embodiment of a locking system.

FIG. 8 schematically shows a locking system 70 comprising a lock 100; a reception unit 44; an energy supply 74; and a central unit 76. The central unit 76 can be formed by an on-board computer of an electric vehicle, in particular of an electric bicycle. A user of the electric vehicle can generate an opening or closing command for the lock 100 at the central unit 76. For this purpose, the user, for example, has to authenticate himself at the central unit 76 or transmit a secret code to the central unit 76. For example, the central unit 76 can already automatically perform a user authentication via the exchange of electronic keys with a smartphone of the user when the user approaches the electric vehicle with the smartphone. On a successful authentication, the central unit 76 can be activated and a display of the central unit 76 can in particular be switched on. To open or close the lock 100, the input of a closing command on the display of the central unit 76 can take place. For this purpose, a secret code for the lock 100 can be requested, for example by way of a PIN input on the display. However, it is also possible to dispense with the inquiry about the secret code so that the secret code so-to-say corresponds to the positive user authentication by way of which access to the central unit 76 itself has been enabled.

If the authentication is successful or the transmitted secret code is correct, the central unit 76 forwards the opening or closing command, for example in the form of a release signal for adjusting the blocking element 36 into the release position, to the reception unit 44. For this purpose, a signal line 78 is provided in accordance with FIG. 8. Alternatively, a wireless transmission of the release signal to the reception unit 44 can also be provided.

In response to the release signal received from the central unit 76, the reception unit 44 activates the actuator 42 via a control line 80 to adjust the blocking element 36 into the release position. The reception unit 44, the lock 100, and the central unit 76, which is configured as an on-board computer, are supplied with energy by the common energy supply 74.

Instead of the lock 100, an apparatus 10 for securing an energy store 12 can also be provided. In this case, the energy supply 74 can be formed by the energy store 12 itself or can be supplemented by it.

Figure 9:
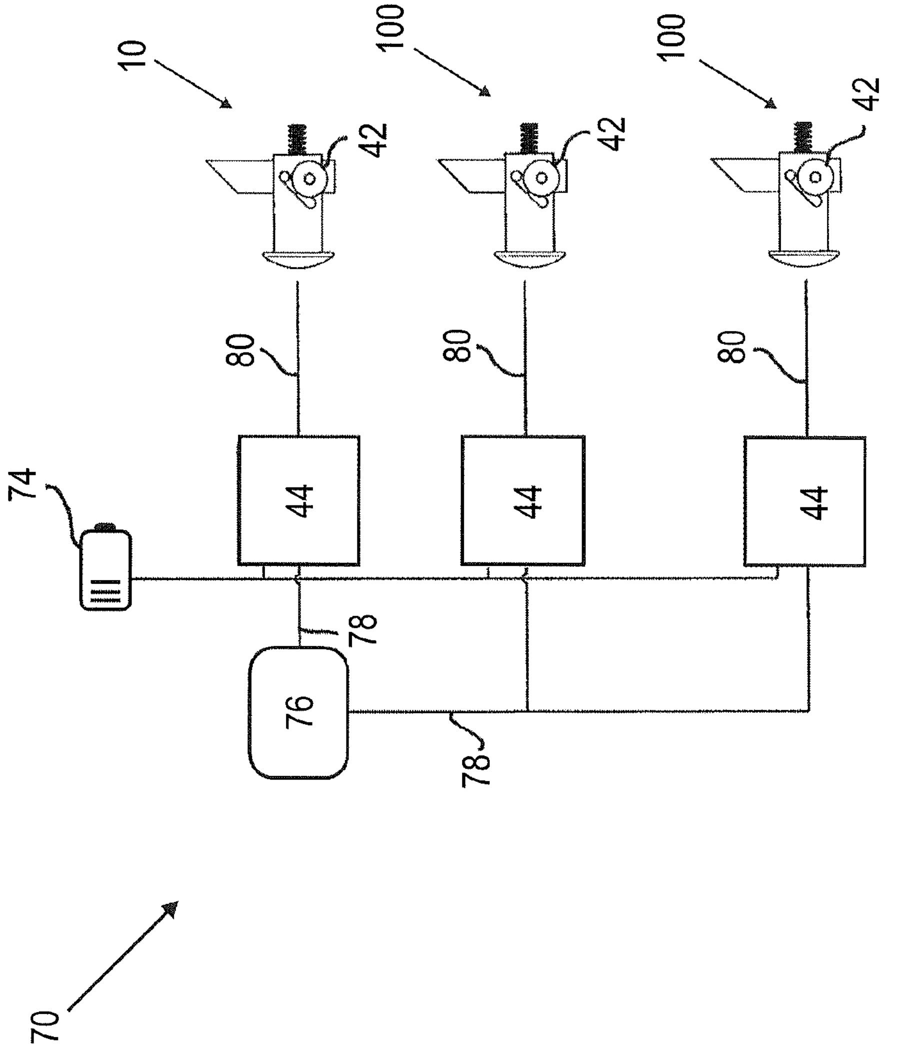
FIG. 9 is a further embodiment of a locking system.

FIG. 9 shows a locking system 70 comprising two locks 100; and an apparatus 10 for securing an energy store that are controllable members of a common central unit 76. The locks 100 are a frame lock and a case lock. The apparatus 10 for securing an energy store and the locks 100 are each merely shown schematically and can generally be different types of electrically actuable locks, in particular based on the embodiments shown in FIGS. 1 to 7. The locks 100 and the apparatus 10 each have a separate reception unit 44 that is configured to receive a control command, for example a release signal, relating to the respective lock 100 or to apparatus 10 from the central unit 76 and to forward it to the actuators 42 of the locks 100 or of the apparatus 10.

The locks 100, the apparatus 10, the reception unit 44, and the central unit 76 have a common energy supply 74 in the form of a battery that is arranged spatially separate from the consumers and that is connected to the consumers via supply lines. Alternatively, the energy supply 74 can be the energy store 12 to be secured by the apparatus 10.

At the central unit 76, an individual opening or closing command can be generated for each of the locks 100 or for the apparatus 10, for example through a user input on a display of the central unit 76. In the provided embodiment, a common secret code is provided for all the locks 100 and for the apparatus 10. The secret code is transmitted by the user to the central unit 76. The central unit 76 then enables the input of locking or opening commands for each lock 100 or for the apparatus 10 on its display, wherein the secret code is not requested again each time.

Alternatively, after the input of the secret code by the central unit 76, a release signal can be transmitted directly to the reception unit 44 of the locks 100 or of the apparatus 10. Alternatively or additionally, a respective separate secret code can be provided for some or each of the locks 100 or for the apparatus 10.

On the completion of the use, access to the locks 100 and to the apparatus 10 is blocked so that repeat locking or opening commands or release signals can only be generated after a repeat input of the secret code. The blocking of access can, for example, take place after the elapse of a certain period of non-use of the electric vehicle and/or through a user input on the display.

REFERENCE NUMERAL LIST

10 apparatus
12 energy store
14 latch
16 movement of the latch
18 recess of the energy store
19 spring
20 insertion of the energy store
22 cam surface
24 actuation mechanism
24 handle
28 torque transmission element
29 rotation of the torque transmission element
30 eccentric element
32 square opening
33 shaft
34 blocking device
36 blocking element
38 adjustment of the blocking element
32 opening
42 electromechanical actuator
44 reception unit
46 authentication module
48 emergency release mechanism
50 lock cylinder
52 coupling device
54 first coupling element
56 second coupling element
58 push button
59 spring

60 slotted part
62 pin
64 frame
65 recess for the blocking element
66 press-in direction of the push button 58
68 direction of movement of the latch into the latched position
70 locking system
74 energy supply
76 central unit
78 signal line
80 control line
100 lock
Z longitudinal axis of the cylinder

What is claimed is:

1. A lock comprising a locking mechanism that has a latch that is movable between a latched position, which is provided for securing a counter-piece movable relative to the locking mechanism, and an unlatched position provided for releasing the counter-piece, and a blocking device, the blocking device comprising:

a blocking element that is adjustable between a blocking position, in which the latch is blocked in its latched position, and a release position in which the latch is movable into its unlatched position; and a reception unit for receiving a release signal by which the adjustment of the blocking element into the release position can be brought about;

wherein the latch is brought from the latched position into the unlatched position against a restoring force of a spring, wherein the spring is configured to apply a restoring force to the latch when in the unlatched position, such that the latch is brought back into the latched position by the spring;

wherein the blocking element is in direct engagement with the latch when the latch is in its latched position and blocked by the blocking element, wherein the blocking element is brought into direct engagement with the latch in order to block the latch in its latched position;

wherein when the latch is in the latched position and blocked by the blocking element, the latch is blocked from operation;

wherein the blocking element is not in direct engagement with the latch when the latch is in its release position.

2. The lock in accordance with claim 1, wherein the counter-piece is an energy store or a component of an energy store, or a bolt of a frame lock or of a brake disk lock, or a closing hoop or a catch of a case lock.

3. The lock in accordance with claim 2, wherein the energy store or the component of an energy store, the bolt of a frame lock or of a brake disk lock, or the closing hoop or the catch of a case lock, in each case are of an electric bicycle.

4. The lock in accordance with claim 1, wherein the blocking device comprises an actuator for adjusting the blocking element.

5. The lock in accordance with claim 4, wherein the actuator is one of an electromechanical actuator and an electromagnetic actuator.

6. The lock in accordance with claim 1, wherein the reception unit is configured for a wireless signal reception.

7. The lock in accordance with claim 6, wherein the reception unit comprises at least one of a Bluetooth module, an RFID module, and a WLAN module.

8. The lock in accordance with claim 1, wherein the blocking device comprises an authentication module for authenticating a received release signal.

9. The lock in accordance with claim 1, wherein the locking mechanism has an actuation mechanism that provides a manual movement of the latch into the unlatched position.

10. The lock in accordance with claim 9, wherein the actuation mechanism transmits a translatory actuation movement to the latch.

11. The lock in accordance with claim 9, wherein the actuation mechanism transmits a rotary actuation movement to the latch.

12. The lock in accordance with claim 1, wherein, in order to block the latch in the latched position, the blocking element is brought into engagement with the locking mechanism.

13. The lock in accordance with claim 12, wherein the blocking element is brought into engagement with an actuation mechanism, a handle, a torque transmission element, and/or the latch.

14. The lock in accordance with claim 1, wherein an adjustment of the blocking element between the blocking position and the release position comprises a linear movement of the blocking element.

15. The lock in accordance with claim 14, wherein the linear movement of the blocking element is brought about along a longitudinal axis of the blocking element.

16. The lock in accordance with claim 1, wherein an adjustment of the blocking element between the blocking position and the release position comprises a rotational movement and/or a translational movement of the blocking element.

17. The lock in accordance with claim 1, wherein the latch engages, in its latched position, into a recess of the counter-piece.

18. The lock in accordance with claim 1, wherein an apparatus has an emergency release mechanism for unlocking the locking mechanism when the blocking element is in the blocking position.

19. The lock in accordance with claim 18, wherein the emergency release mechanism comprises a lock cylinder for an unlocking of the locking mechanism by way of a key.

20. The lock in accordance with claim 18, wherein the emergency release mechanism comprises a coupling device that is connected between the blocking device and the latch and that allows a movement of the latch when the emergency release mechanism is actuated and when the blocking element is in the blocking position.

21. The lock in accordance with claim 1, wherein the latch directly engages the counter-piece and prevents movement of the counter-piece in the latched position.

22. A locking system, comprising at least one lock, the at least one lock comprising:

a locking mechanism that has a latch that is movable between a latched position, which is provided for securing a counter-piece movable relative to the locking mechanism, and an unlatched position provided for releasing the counter-piece, a blocking device, the blocking device comprising:
a blocking element that is adjustable between a blocking position, in which the latch is blocked in its latched position, and a release position in which the latch is movable into its unlatched position, and
a reception unit for receiving a release signal by which the adjustment of the blocking element into the release position can be brought about;
an energy supply; and
a central unit;
wherein the latch is brought from the latched position into the unlatched position against a restoring force of a spring,
wherein the spring is configured to apply a restoring force to the latch when in the unlatched position, such that the latch is brought back into the latched position by the spring;
wherein the blocking element is in direct engagement with the latch when the latch in its latched position and blocked by the blocking element, wherein the blocking element is brought into direct engagement with the latch in order to block the latch in its latched position;
wherein when the latch is in the latched position and blocked by the blocking element, the latch is blocked from operation;
wherein the blocking element is not in direct engagement with the latch when the latch is in its release position.

23. The lock in accordance with claim 22,
wherein the latch directly engages the counter-piece and prevents movement of the counter-piece in the latched position.

24. A lock comprising
a locking mechanism that has a latch that is movable in two opposite translational directions between a latched position, which is provided for securing a counter-piece movable relative to the locking mechanism, and an unlatched position provided for releasing the counter-piece, and
a blocking device, the blocking device comprising:
a blocking element that is adjustable between a blocking position, in which the latch is blocked in its latched position, and a release position in which the latch is movable into its unlatched position; and
a reception unit for receiving a release signal by which the adjustment of the blocking element into the release position can be brought about;
wherein the latch is brought from the latched position into the unlatched position against a restoring force of a spring,
wherein the spring is configured to apply a restoring force to the latch when in the unlatched position, such that the latch is brought back into the latched position by the spring;
wherein the locking mechanism has an actuation mechanism that provides a manual movement of the latch into the unlatched position, the actuation mechanism comprising a handle and a torque transmission element for transmitting a torque from the handle to the latch by way of an eccentric element connected between the torque transmission element and the latch;
wherein the blocking element blocks latch movement in the two opposite translational directions when the blocking element is in engagement with the actuation mechanism of the locking mechanism.

25. The lock in accordance with claim 24, wherein when the blocking element is in engagement with the actuation mechanism, the blocking element engages the handle or the torque transmission element.

* * * * *